2,259,088

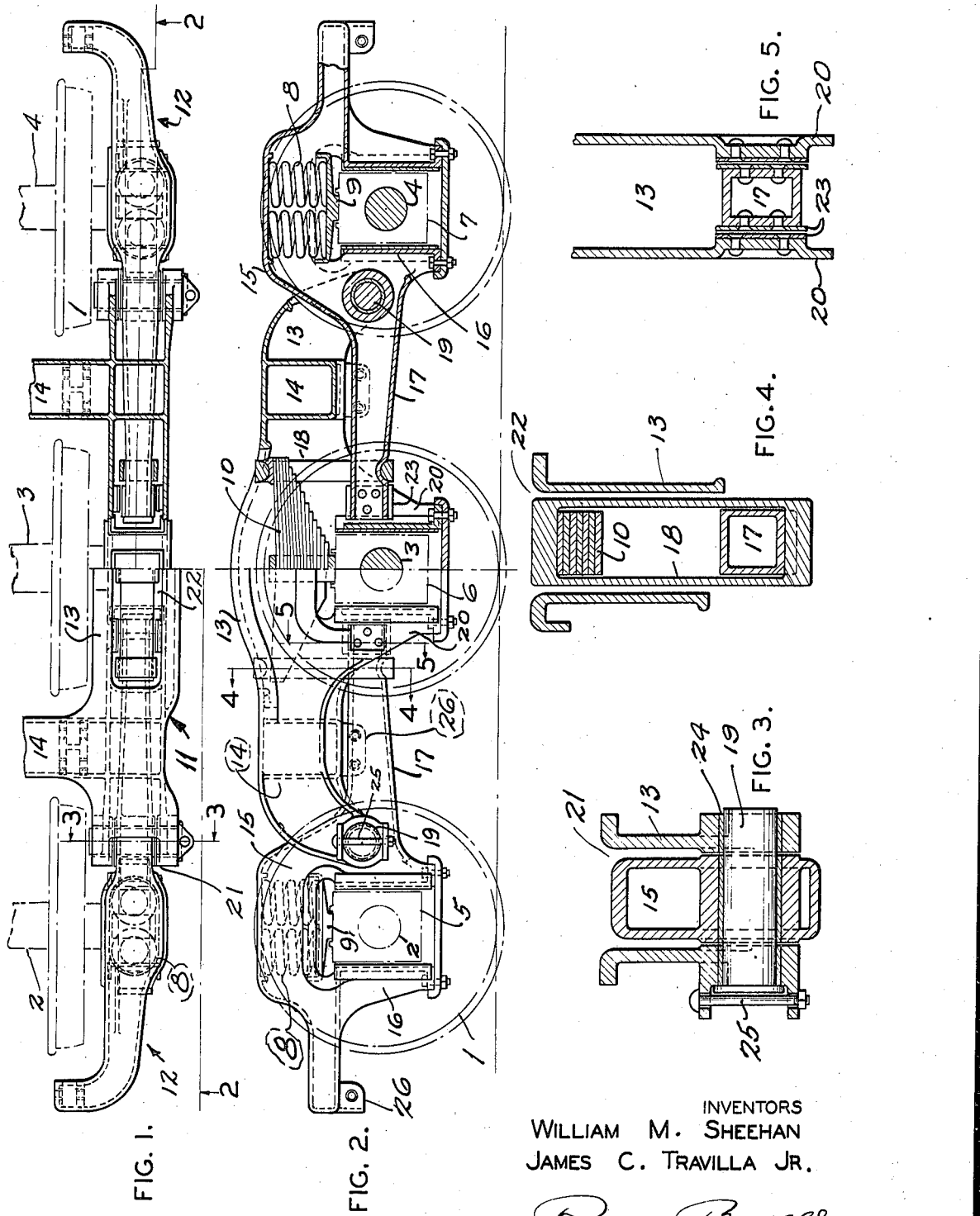
Oct. 14, 1941. W. M. SHEEHAN ET AL 2,259,088
RAILWAY TRUCK
Filed April 10, 1939
INVENTORS
WILLIAM M. SHEEHAN
JAMES C. TRAVILLA JR.
BY Rodney Bedell
ATTORNEY Patented Oct. 14, 1941

UNITED STATES PATENT OFFICE 2,259,088

RAILWAY TRUCK

William M. Sheehan, Philadelphia, Pa., and James C. Travilla, Jr., University City, Mo., assignors to General Steel Castings Corporation, Granite City, Ill., a corporation of Delaware Application April 10, 1939, Serial No. 267,092

8 Claims. (Cl. 105—195)

The invention relates to railway rolling stock and more particularly to truck structure.

The main object of the invention is to provide a light weight truck with a simple equalizing arrangement which will give the truck easy riding qualities.

Another object of the invention is to produce a truck of the type described which will be economical to manufacture and maintain.

These and other detailed objects of the invention are attained by the structure illustrated in the accompanying drawing in which—

Figure 1 is a top view and horizontal section of one side of a six wheel truck embodying one form of the invention.

Figure 2 is a side elevation and vertical longitudinal section taken on the line 2—2 of Figure 1.

Figures 3, 4 and 5 are vertical transverse detail sections taken on the corresponding section lines of Figures 1 and 2 and drawn to an enlarged scale.

The truck wheels 1, axles 2, 3 and 4 and journal boxes 5, 6 and 7 are of usual construction. End boxes 5 and 7 mount coil springs 8 through spring seats 9. Center journal box 6 mounts a leaf spring 10 extending longitudinally of the truck.

The truck framing consists preferably of five parts comprising a center frame 11 and four separate end frames 12. The center frame includes wheel pieces 13 at opposite sides of the truck and connected by transverse transoms 14. The center frame also includes a center plate (not shown) for receiving the truck load and this center plate will be carried by transoms 14 either directly or through any familiar swing hanger arrangement.

Each end frame 12 comprises a wheel piece 15 resting on springs 8 and having depending legs 16, thereby forming a pedestal for the corresponding journal box, and having an arm 17 extending towards the middle journal box 6 but terminating short thereof and supported by link 18 from the adjacent end of leaf spring 10.

Each end wheel piece 12 has a horizontal pivot connection 19 to an end of the adjacent wheel piece member 13 of center frame 11. Center frame wheel piece 13 has depending legs 20 whereby the wheel piece forms a pedestal receiving the middle journal box 6 although wheel piece 13 does not rest directly upon the journal box or its spring 10 but is supported exclusively by pins 19. Preferably each pin 19 is positioned so that the distance between the same and the adjacent axle is one-half of the distance between the pin and the adjacent supporting link 18. With this arrangement the end frames function as equalizers to distribute the truck load evenly to all three axles and to equalize the spring actions.

Each end of center frame wheel piece 13 is shown as bifurcated at 21, to receive the adjacent portion of end frame 12, and the middle portion of the wheel piece is bifurcated at 22 to accommodate leaf spring 10 and its links 18 and to receive the end portions of arms 17 on end frames 15. Preferably the vertical opposing elements of arm 17 and wheel pieces 13 are provided with renewable wear plates 23 of hardened steel or other suitable material. Similarly the opening in the end of wheel piece 13 is bushed at 24 for the pivot pin 19.

Cotters or bolts 25 detachably secure pins 19 in place and these four pins constitute the sole means for joining the five piece frame structure together. Preferably the framing members are castings with box shaped cross sections whereby they possess maximum strength for a given amount of material and are adapted to house the springs and to receive each other whereby the parts may overlap and the height of the truck structure is minimized without decreasing the depth of the individual frame elements.

The usual brake hanger brackets, as indicated at 26, and other elements for mounting the brake gear, not shown, may be provided. The end frames at opposite sides of the truck may be united but the separation of these frames provides a greater degree of flexibility and simplifies the construction.

Obviously the details of the truck may be varied in other ways than indicated above and the exclusive use of such modifications of the invention as come within the scope of the claims is contemplated.

What is claimed is:

1. In a railway truck, end and intermediate wheeled axles, journal boxes thereon, a load-receiving center frame having pedestals for slidably receiving the journal boxes of the intermediate wheeled axle, end frames movable relative to said center frame and having pedestals for the journal boxes of other wheeled axles, and having arms extending inwardly from the ends of the truck past the ends of said center frame and having pivotal connections thereto for supporting said center frame, and springs supporting said end frames from all of said axles independently of said center frame, 2. In a railway truck, three wheeled axles, a center frame member with a wheel piece at the side of the truck extending longitudinally of the truck over the center axle and to points between the center axle and the end axles, an end frame carried by spring structure on each end axle and extending inwardly of the truck to a point between its axle and the center axle, said center frame member wheel piece being bifurcated at its ends to receive the intermediate portions of said end frames and bifurcated at its central part to receive the end portions of said end frames, horizontal pivot pins through said end frames and the ends of said center frame wheel pieces, and means supporting said end frames on the middle axle.

3. A structure as described in claim 2 in which the end axle spring structures are coil springs and the means supporting the end frames on the center axle comprises leaf springs having link connections to the adjacent ends of the end wheel pieces.

4. In a railway truck, a series of wheeled axles, journal boxes on said axles, a yielding unit consisting of leaf springs carried directly by one of said boxes, a yielding unit consisting of coil springs carried directly by at least one of the other boxes on the same side of the truck, and structure supported by said units and including truck load supporting framing elements, and elements equalizing the truck load to all of said springs.

5. In a railway truck, a series of wheeled axles, journal boxes on said axles, an individual spring unit carried directly by each box, at least one unit on one side of the truck comprising a leaf spring arrangement and at least two other units on that side of the truck each comprising a coil spring arrangement, and structure supported by said springs and including truck load supporting framing elements, and elements equalizing the truck load to all of said springs.

6. In a railway truck, a series of wheeled axles, journal boxes on said axles, an individual spring unit carried directly by each box, the units on the end boxes comprising coil springs and the units on the intermediate boxes comprising leaf springs, and structure supported by said springs and including truck load supporting framing elements, and elements equalizing the truck load to all of said springs.

7. In a railway truck, end and intermediate wheeled axles having journals, journal boxes thereon, individual springs carried by each journal box, end and intermediate framing structure acting as equalizers to distribute the truck load to said axles, each framing having pedestals slidable vertically on the corresponding journal boxes independently of the vertical movement of the other framing on the other journal boxes, the end framing being carried directly by said springs independently of the intermediate framing and the intermediate framing being pivotally carried on the end framing independently of the springs, said intermediate framing having a centrally positioned center plate for receiving the truck load.

8. In a railway truck, end and intermediate wheeled axles, journal boxes thereon, individual springs on said journal boxes, a load receiving center frame, end frames movable relative to said center frame and having pedestals slidably receiving the journal boxes of the end axles, said end frames having arms extending inwardly from the ends of the truck and terminating adjacent to the journal boxes of the intermediate axle, said center frame being supported solely on said end frames and transferring the truck load directly to the latter, and said end frames being supported solely on said springs and equalizing the load received from said center frame to all of said axles, the end frame over each end axle journal box being separate from and movable vertically relative to each of the other end frames and the center frame being provided with pedestals slidably receiving the journal boxes of the intermediate axle, the center frame holding the end frames on the same side of the truck against relative movement longitudinally of the truck and holding the end frames at opposite sides of the truck against relative movement transversely of the truck.

WILLIAM M. SHEEHAN.
JAMES C. TRAVILLA, Jr.